US007321786B2

(12) United States Patent
Cedraeus

(10) Patent No.: US 7,321,786 B2
(45) Date of Patent: Jan. 22, 2008

(54) METHOD FOR A RANDOM-BASED DECISION-MAKING PROCESS

(75) Inventor: Hugo Cedraeus, Bromma (SE)

(73) Assignee: Cedraeus Incorporated, Southern Pines, NC (US)

( * ) Notice: Subject to any disclaimer, the term of this patent is extended or adjusted under 35 U.S.C. 154(b) by 152 days.

(21) Appl. No.: 10/565,516

(22) PCT Filed: May 21, 2004

(86) PCT No.: PCT/US2004/015949

§ 371 (c)(1),
(2), (4) Date: Jan. 23, 2006

(87) PCT Pub. No.: WO2005/069498

PCT Pub. Date: Jul. 28, 2005

(65) Prior Publication Data

US 2006/0281496 A1 Dec. 14, 2006

Related U.S. Application Data

(60) Provisional application No. 60/481,807, filed on Dec. 17, 2003.

(51) Int. Cl.
*H04B 1/38* (2006.01)
*H04M 1/00* (2006.01)

(52) U.S. Cl. .................. 455/566; 455/556.2; 455/90.1; 455/550.1; 715/810

(58) Field of Classification Search ................ 455/566, 455/550.1, 556.2, 552.1, 564, 562.1, 63.4, 455/90.2, 90.1, 563, 95; 713/200, 201, 202; 715/810

See application file for complete search history.

(56) References Cited

U.S. PATENT DOCUMENTS

| 5,386,457 | A * | 1/1995 | Cotsonas et al. ........... 455/465 |
| 6,289,459 | B1 * | 9/2001 | Fischer et al. ................ 726/17 |
| 2002/0028687 | A1 * | 3/2002 | Sato et al. ................... 455/466 |
| 2007/0155331 | A1 * | 7/2007 | Ylitalo ....................... 455/63.4 |

* cited by examiner

*Primary Examiner*—Edward F. Urban
*Assistant Examiner*—John J. Lee
(74) *Attorney, Agent, or Firm*—Rolf Fasth; Fasth Law Offices

(57) ABSTRACT

The method is for a random-based decision making process. A communication device is activated and a menu is displayed. In a selecting step a random generating item is selected from the menu. The variables are then defined and the variables may be provided with different weighing factors. A random generator generates a random result based on the weighed variables. The random result is presented in the communication device. The presentation may be made at a random time, a specific time or right after the generation of the result.

10 Claims, 2 Drawing Sheets

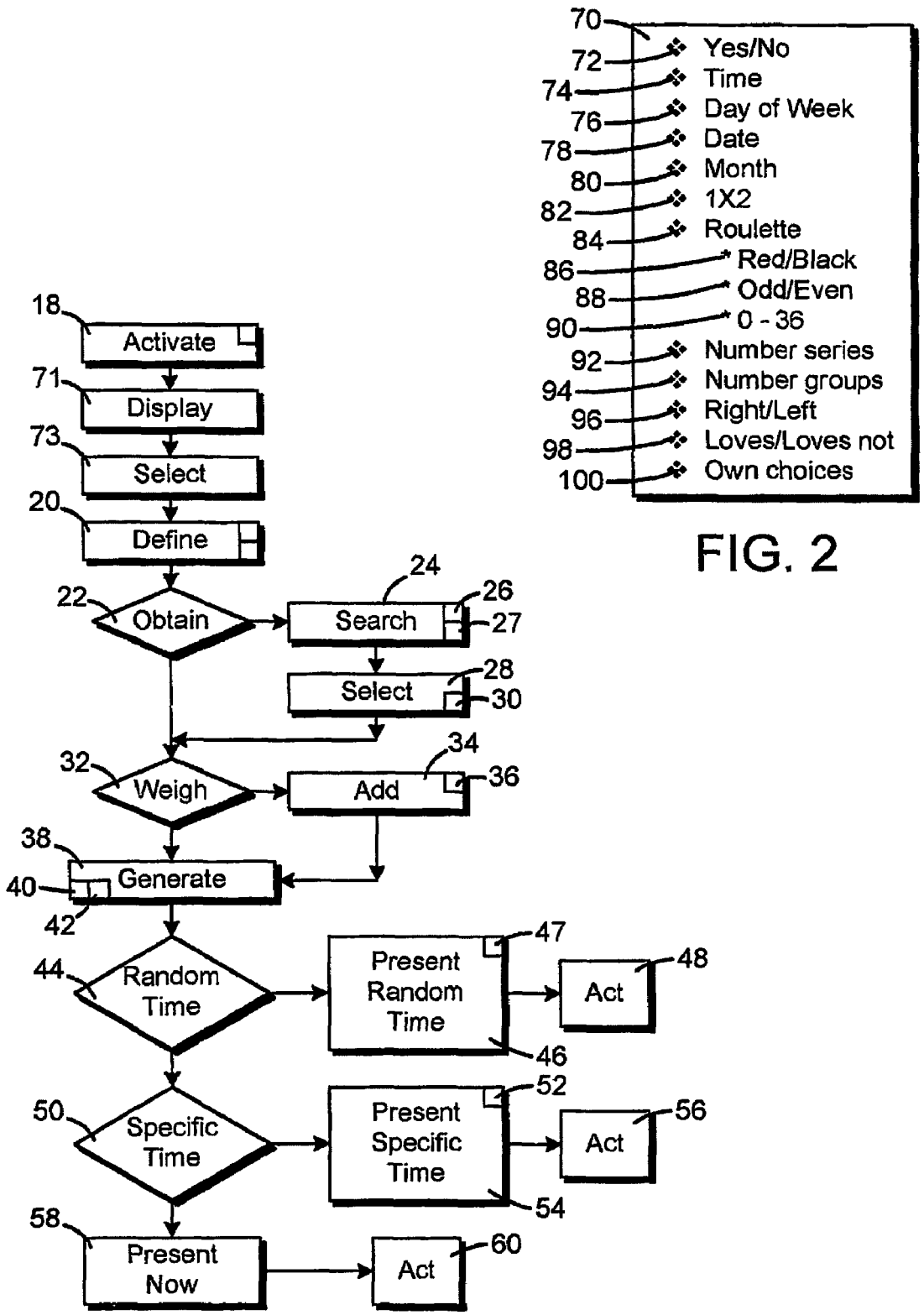

METHOD FOR A RANDOM-BASED DECISION-MAKING PROCESS

PRIOR APPLICATION

This application is a U.S. national phase application based on International Application No. PCT/US2004/015949, filed 21 May 2004, claiming priority from U.S. Provisional Patent Application No. 60/481,807, filed 17 Dec. 2003.

TECHNICAL FIELD

The present invention relates to a random-based decision-making process that may be operated on a communication device such as a mobile telephone.

BACKGROUND OF THE INVENTION

In today's society people must make many decisions of which the outcome of some of the decisions is not really important. The increased information flow requires people to make more quick decisions. However, although the choices are very similar and it does not make any difference which choice is selected, people tend to spend time and effort to make best decisions anyway. This may cause harmful stress and reduce the quality of life. Efforts have been made to create complicated algorithms that attempt to make rational decisions and that strive to eliminate any randomness in the decision making process. The routine decision-making process may also lead to a monotonous lifestyle.

In many situations there is a need for making decisions that are, at least partially, based on randomness and not on any rationality. For example, everyday chores are filled with a great number of choices and decision-making situations. In a majority of such decisions the consequences of the decision made are of little importance. For example, the consequence of eating spaghetti or macaroni is of little or no importance. It is therefore not particularly useful to allocate any resources and effort when making those decisions to avoid stress and other negative results. In this way, the accumulated effect of all the unimportant decisions that are made may lead to harmful stress. Individuals or patients with obsessive-compulsive disorders often develop complicated rituals of everyday routines that are time consuming and a burden both to the individual and the surrounding. These rituals are often very difficult for the individual to break up without an external support. The routine decision making process may also lead to lifestyles that hinder creative thinking. Some public personalities, such as film stars and politicians, may fall into the trap of following the same daily routines thus making them more vulnerable to attacks, kidnappings and other criminal acts because their behavior is predictable. At places of entertainment, such as discos, nightclubs, restaurants, cafes and sports arenas, it is common for visitors to form long lines. Many of such places have as a policy to maintain long lines to make it seem like a reward to be let in and to make the place look more popular. It is not even certain that the first person in the line is let in first. Sometimes well-known people and others, such as celebrities and artists, are permitted to get in although they are way back in the line or just arrived. One problem with long lines is that it is boring to stand in the lines and the experience can sometimes be frustrating particularly if people in the back of the line, or have not been in the line at all, are let in first. In some situations, it is advantageous to provide a surprise such as in a war situation or when competing against competitors in a fiercely competitive market. It makes the behavior less predictable. A change in the everyday routines may also add excitement to the daily life. There is also a need for a method to reduce the unnecessary and harmful stress and to provide a more interesting lifestyle.

SUMMARY OF THE INVENTION

The method of the present invention provides a solution to the above-outlined problems. More particularly, the method of the present invention is for a random-based decision-making process. A handheld or stationary communication device is activated and a basic main menu is displayed. In a selecting step a random generating item is selected from the menu. The item can be either text formed by letters or pictures of objects or symbols depicting objects. The variables are then defined and the variables may be provided with different weighing factors. A random generator generates a random result based on the weighed variables. The random result is presented in the communication device. The presentation may be at a random time, a specific time or right after the generation of the result. The user may then act based on the randomly generated result.

BRIEF DESCRIPTION OF THE DRAWING

FIG. 1 is a schematic view of a flow chart of the method of the present invention;

FIG. 2 is a schematic illustration of a menu of the present invention;

DETAILED DESCRIPTION

With reference to FIGS. 1-6, the method 10 of the present invention provides the user the possibility of making weighed or un-weighed random-based decisions at any time. The user may make any decision in life random-based.

Figure 3:
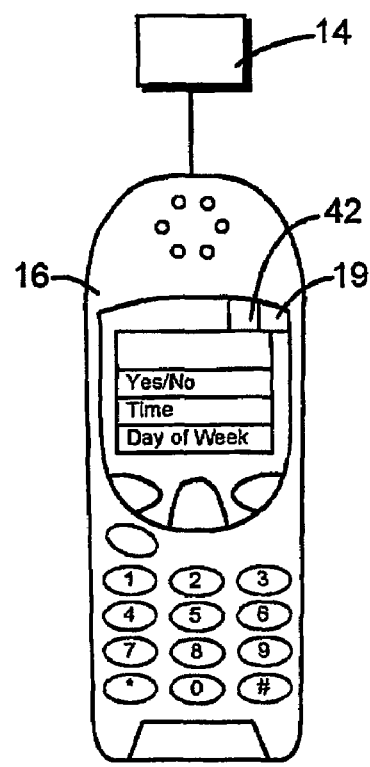
FIG. 3 is a schematic front view of a communication device used by a user.

The user or users 14, as shown in FIG. 3, may first activate a communication device 16 in an activation step 18 (see FIG. 1) to run a random generating program 19. The program 19 may either be preinstalled in the communication device 16 or be downloadable from a web page or any other suitable program-source. For example, when the user is in a new town, the user may display a list of restaurants/theaters in the area and have the device 16 randomly generate to which restaurant/theater the user could go. The list may include selected, un-selected or pre-selected restaurants. It is also possible to select sub-groups within the database.

The communication device may be a mobile telephone, mobile or stationary computer, PDA or any other suitable device that may be used to run the random generating program 19. The activation may take place when the user would like to make a random-based decision. For example, when the users do not agree and would like the program 19 to make the decision for them.

Upon activation, the communication device 16 displays a basic main menu 70 including random generating items, as partially shown in FIG. 3. It may also be possible to expand the menu 70 by included additional categories that may be added from external databases, as described in detail below.

Figure 4:
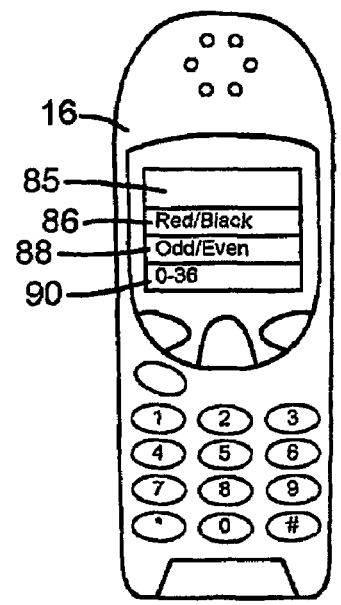
FIG. 4 is a schematic front view of the communication device showing a roulette menu.

FIG. 2 shows an illustrative example of the basic main menu 70 that includes categories such as a yes/no item 72, time item 74, day-of-week item 76, date item 78, month item 80, 1×2 item 82, right/left 81, and a loves/loves not item 79. It should be understood that the menu 70 is only used as an illustrative example and the menu may vary greatly according to the intended use and user. As best shown in FIG. 4, a roulette item 84 includes a second menu 85 with red/black 86, odd/even 88 and 0-36 numbers 90. When activating the roulette item 84, it is sufficient to select one of the options in the second menu 85.

The item 72 may simply be used to randomly answer yes or no to a question. The time item 74 may be used to generate a random time that may be within a predetermined time interval. It may also be possible to define several time intervals and give each time interval a weight factor. The day-of-week item 76 may be used to randomly generate a weekday. The date item 78 may be used to randomly generate a date. The month item 80 may be used to randomly generate a month. The 1×2 item 82 may be used for betting such as predicting future soccer results. The right/left item 81 may be used to randomly select between left and right. The device 16 may also be connected to a GPS unit to randomly select directions for the user. The loves/loves not item 79 may be used to randomly determine if a person loves another person or not.

Figure 5:
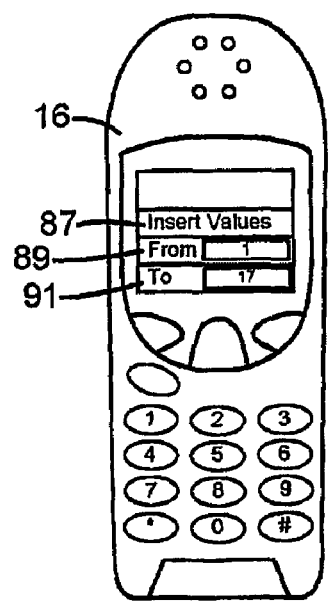
FIG. 5 is a schematic front view of the communication device showing a number menu.

The menu also includes number series 92, number groups 94 and own choices 100. Most of the categories on the menu 70 may be used to generate a random result right away. However, the categories time 74, roulette 84, number series 92, number groups 94 and own choices 100 may be set up to produce a second menu. Regarding number series 92 the device 16 displays a menu 87, as shown in FIG. 5, so that the user may create a number interval ranging from a start value 89 to an end value 91. The device may then generate a random number in the predefined number interval defined by the values 89, 91. The number groups 94 relate to defining number groups, such as 3, 7, 15, so the device may generate a random number from the numbers in the number group. Any number sequences could be included in the number groups 94.

Figure 6:
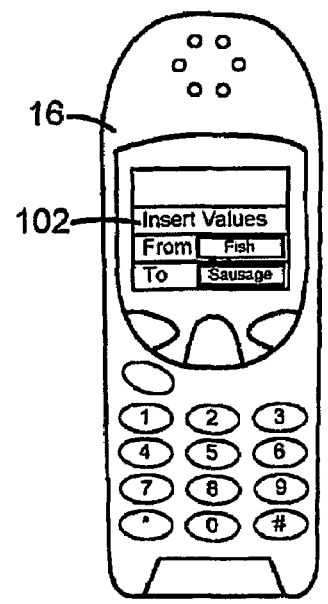
FIG. 6 is a schematic front view of the communication device showing a customized menu.

If the user selects the own choice item 100, the variables that are inserted into a menu 102 may be fish, sausage or pizza, as shown in FIG. 6, or any other variables. In this way, the device 16 may generate a random result so that the user does not have to decide what to eat. It may also be possible to affect the outcome of the random generation by adding the same item more than once into the menu 102 to increase the chances for that item to be selected in the random generation process. The user can also insert photos taken by the user's or other person's mobile phone or insert pictures or symbols.

The program 19 may be adapted so that the user may simply go into another database and select the desired items such as stocks from a stock exchange list. The device 16 may then generate a random result based on the selected stock items to produce a stock that the user could buy.

In this way, the communication device 16 displays the main-menu 70 in a displaying step 71. In a selecting step 73, the user selects a random generating item 72, 74, 76, 78, 80, 82, 84, 92, 94, 81, 79, 100 from the menu 70. As mentioned above, the menu 70 may be modified, as desired, by including external databases or by changing the content of the menu itself.

In a definition step 20, the user defines the variables 21 of the decision making process 23. In an obtaining step 22, the user may decide whether more variables should be obtained from an outside source. If so, a search 24 may be conducted in a database 26 to find additional variables 27. In a selection step 28, the user may select the variables 30 that are to be included in the decision making process. The databases 26 may be adapted or customized to certain users so that young females may prefer databases that are different from databases selected by middle-aged men.

In a weighing step 32, the user may give the variables 30 a different weight so that the variables with the highest weight are most likely to be generated in a random generator. In an adding weighing factor step 34, the user may assign each variable 30 with a different weight factor 36 before sending the weighed variables to a random generating step 38. For example, the user may give certain variables a higher weight factor to increase the likelihood of being generated because the consequences of the variables are desirable. Of course, the user may also give variables with less desirable consequences a lower weight factor. If no weighing is needed the variables may be sent directly from the step 32 to the generating step 38.

In the generating step 38, a random result 40 is generated using a random generator 42. The user may decide to run the generating step more than once so that a different random result is generated. The result 40 may be presented in many different ways. In a random time step 44, it is determined whether the result should be presented at a random time or not. If so, the result is presented at a random time 47 in a presenting step 46 upon which the user may act in an acting step 48.

In a specific time step 50, it is determined whether the result should be presented at a specific time or not. If so, the result is presented at a specific time 52 in a presenting step 54. The user may then act upon the result in an acting step 56. If the result is neither to be presented at a random time nor at a specific time, the result may be presented right away in a presenting step 58 upon which the user may act in an acting step 60.

It may also be possible to include additional users so that each user, for example, adds an item on the menu 100, or any other menu, before the device 16 generates a random result. It may also be possible for the users to be located in different locations, such as Stockholm, Paris and Arizona, and use either the mobile telephone network or Internet to communicate and to see the randomizing process on their respective displays, in real time.

The device 16 may also display randomly chosen pop-up messages that the user may want to see. The messages may be displayed at random times as desired. The pop-up messages may also be used to prevent the user from doing something, such as eating or smoking or to break up established or compulsive routines. It is also possible for the user to allow for randomly chosen pop-up messages or pictures/images to be sent to other persons at random times, as desired.

It is also possible for many persons to send in photographs via their mobile telephones when the telephones are equipped with a digital camera or to add photographs/pictures/images from a database. This may serve as a basis for the random selection process and the photographs/pictures/images and selection process may be shown on the user or users mobile telephones simultaneously or projected on a wide screen television.

To resolve the issue of frustrated people in long lines, the people may be permitted to send in photos of themselves to a computer of the entertainment place via SMS or any other suitable technique. The receiving computer may display the photos on the wide screen television that may be seen by all the people in the line. A random generator may then select one of the photos. The person on the photo is then presented as the winner on the wide screen television. The winner may then pass the others in the line and enter into the place of entertainment. The selection process may be such that the photos are first shown at a rapid pace on the screen and then the pace slows down, similar to a roulette wheel, until one of the photos is selected. This provides entertainment for the people in the line. The frustration among the people is reduced and it is possible to also use the wide screen television for advertisement since the people in the line pay attention to the information on the screen. It is also possible for the guards managing the lines to communicate messages to all the people in the line via the wide screen television.

While the present invention has been described in accordance with preferred compositions and embodiments, it is to be understood that certain substitutions and alterations may be made thereto without departing from the spirit and scope of the following claims.

The invention claimed is:

1. A method of using a random based decision making process, comprising:
    activating a communication device;
    the communication device displaying a menu;
    selecting a random generating item from the menu;
    defining variables of a decision making process device;
    providing the variables with different weighing factors;
    inputting weighed variables to a selected random generating item;
    using a random generator generating a random result based on the weighed variables; and
    presenting the random result in the communication device.

2. The method according to claim 1 wherein the method further comprises searching a database for additional variables.

3. The method according to claim 2 wherein the method further comprises selecting variables in a selecting step from the weighed variables.

4. The method according to claim 1 wherein the method further comprises presenting the random result at a random time.

5. The method according to claim 4 wherein the method further comprises an user acting on the random result at the random time.

6. The method according to claim 1 wherein the method further comprises presenting the random result at a specific time.

7. The method according to claim 6 wherein the method further comprises the user acting on the random result at the specific time.

8. The method according to claim 1 wherein the method further comprises adding a starting value and an end value for a number series.

9. The method according to claim 1 wherein the method further comprises selecting an own choice item from the menu and adding items to the menu.

10. The method according to claim 1 wherein the method further comprises adding weighing factor to the items of the menu.

* * * * *